No. 845,123. PATENTED FEB. 26, 1907.
A. C. ROBEY.
CORN CUTTER.
APPLICATION FILED DEC. 13, 1906.
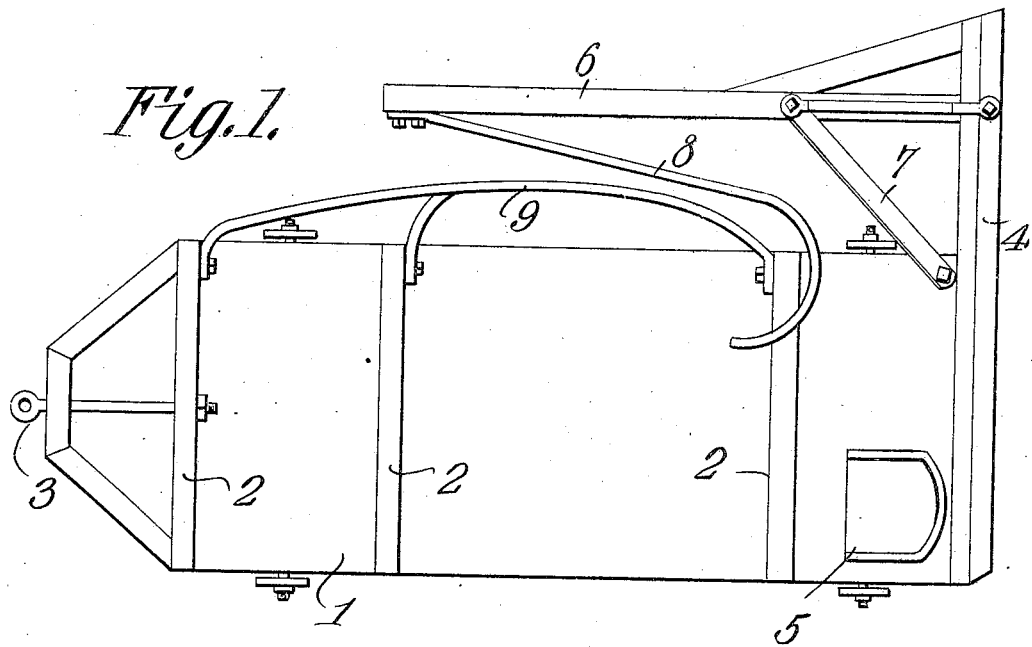
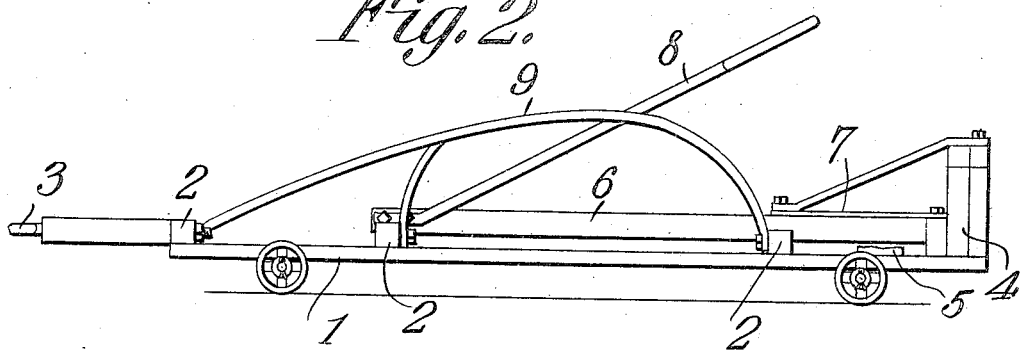
WITNESSES:
Austin C. Robey,
INVENTOR.
By
ATTORNEYS

UNITED STATES PATENT OFFICE.

AUSTIN C. ROBEY, OF MARSHALL, MISSOURI, ASSIGNOR, BY DIRECT AND MESNE ASSIGNMENTS, OF ONE-HALF TO JOHN BLAIR AND ONE-HALF TO OLLIE BURNS, OF MARSHALL, MISSOURI.

CORN-CUTTER.

No. 845,123.

Specification of Letters Patent.

Patented Feb. 26, 1907.

Application filed December 13, 1906. Serial No. 347,680.

*To all whom it may concern:*

Be it known that I, AUSTIN C. ROBEY, a citizen of the United States, residing at Marshall, in the county of Saline and State of Missouri, have invented a new and useful Corn-Cutter, of which the following is a specification.

This invention has relation to corn-harvesters; and it consists in the novel construction and arrangement of its parts, as hereinafter shown and described.

The object of the invention is to provide a cutter or harvester of the nature indicated, which is simple and cheap in construction, safe to operate, and at the same time one that will effectually sever the stalks and collect the same preparatory to bundling or shocking.

The corn-harvester consists, primarily, of a platform, provided upon its upper side with a transversely-extending joists. A side bar is spaced from the edge of the platform, and a corn-knife extends across said space. A corn-bending rod is attached at its forward end to the inner side of the side bar and at the forward end thereof, said rod lying in an inclined plane and having its rear end formed into a semicircular curve which extends over the platform. A semi-ovate obtund fender is attached at its end to the joists and lies in an inclined plane over the space between the platform and the side bar.

In the accompanying drawings, Figure 1 is a top plan view of the corn-harvester, and Fig. 2 is a side elevation of the same.

The harvester consists of the platform 1, which is provided upon its upper surface with the transversely-extending joists 2 2. The eye 3 is provided at the forward end of the platform and affords a draft-animal-attaching means. The vertical wall 4 is provided at the rear end of the platform 1 and a seat 5 is located upon said platform. The side bar 6 is spaced from the edge of the platform 1, and the knife 7 extends across the space between the platform 1 and the side bar 2. The stalk-bending rod 8 lies in an inclined plane and is attached at its forward end to the side of the side bar 6 at the forward end thereof. The rear end of the rod 8 describes a semicircular curve, which extends over the platform 1. The semi-ovate obtund curved fender 9 is attached at its end to the joists 2 and lies in an inclined plane over the space between the edge of the platform 1 and the side bar 6.

From the foregoing description it is obvious that as the cutter is drawn along a row of stalks that as the stalks enter the space between the edge of the platform 1 and the side bar 6 they are bent forward by coming in contact with the rod 8 and are severed by the knife 7. The said stalks fall upon the fender 9, from whence they are shunted onto the platform 1. When sufficient stalks have been thus collected, they may be bundled or shocked, as desired.

Having described my invention, what I claim as new, and desire to secure by Letters Patent, is—

A corn-harvester comprising a platform provided upon its upper side with transversely-extending joists, a side bar spaced from the edge of the platform, a knife extending across the space between the platform and side bar, a corn-bending rod attached at its forward end to the inner side of the side bar at the forward end thereof, said rod lying in an inclined plane and having its rear end formed into a semicircular curve which extends over the platform, a semi-ovate obtund curved fender attached at its ends to the said joists and lying in an inclined plane over the space between the platform and the side bar.

In testimony that I claim the foregoing as my own I have hereto affixed my signature in the presence of two witnesses.

AUSTIN C. ROBEY.

Witnesses:
ROBERT M. REYNOLDS,
S. J. MONTGOMERY.